No. 606,663. Patented July 5, 1898.
J. C. HENRY.
ELECTRIC RAILWAY.
(Application filed Mar. 28, 1898.)
(No Model.) 2 Sheets—Sheet 1.
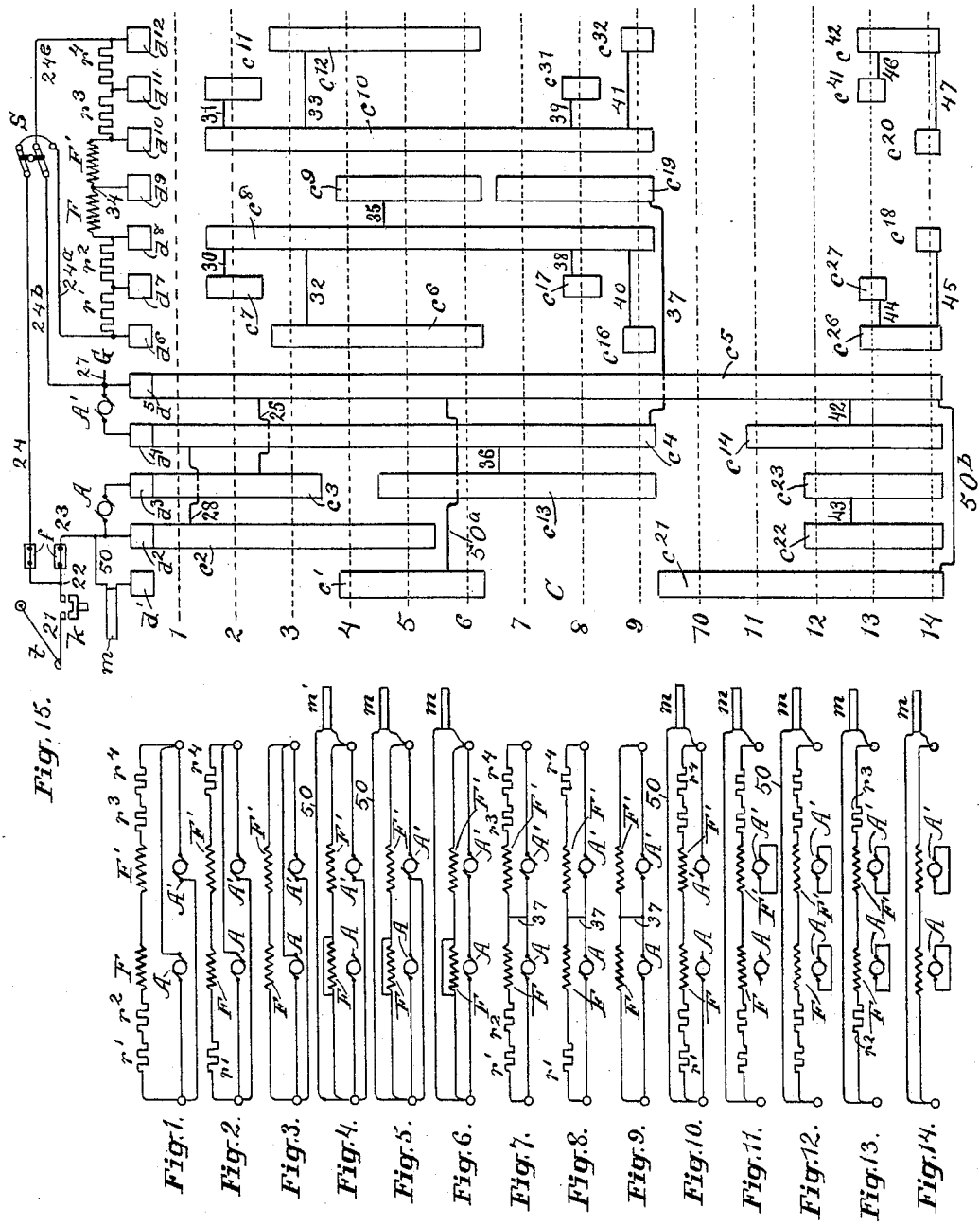
WITNESSES: INVENTOR No. 606,663. Patented July 5, 1898.
J. C. HENRY.
ELECTRIC RAILWAY.
(Application filed Mar. 28, 1898.)

(No Model.) 2 Sheets—Sheet 2.

WITNESSES: INVENTOR
John C. Henry.

United States Patent Office.

JOHN C. HENRY, OF DENVER, COLORADO.

ELECTRIC RAILWAY.

SPECIFICATION forming part of Letters Patent No. 606,663, dated July 5, 1898.

Application filed March 28, 1898. Serial No. 675,411. (No model.)

*To all whom it may concern:*

Be it known that I, JOHN C. HENRY, a citizen of the United States, residing at Denver, in the county of Arapahoe and State of Colorado, have invented certain new and useful Improvements in Electric Railways, of which the following is a specification.

This invention relates to improvements in electric railways; and it consists particularly in novel arrangements and connections of the controlling and operating circuits and devices of electrically-propelled vehicles and in a novel construction of controller for controlling same.

The invention is an improvement upon the subject-matter of my Patents No. 500,066, dated June 20, 1893, No. 591,100, dated October 5, 1897, and No. 597,374, dated January 11, 1898, the improvements comprising, first, means for changing the motors of a two-motor equipment from series to parallel relation or vice versa relation in such manner as to avoid sudden changes of current strength or excessive current in the armature; second, means for eliminating or absorbing the high-tension induced discharge from the field-magnets when the motor-circuit is broken; third, the arrangement and connection of the two motors of the equipment in such manner as to prevent unequal operation or speed of same when they are coupled in series, thus improving the tractive adhesion and preventing racing; fourth, details of the controlling mechanism, including improvements in the magnetic blow-out or arc-rupturing devices and in the contact devices of the controller, and means for preventing the controller from being operated so rapidly as to lead to an undue flow of current, particularly when the motors are discharging current to the line, it being understood that the present invention contemplates the use of the motors as regenerative devices in electromagnetically braking or retarding the vehicle.

Figure 16:
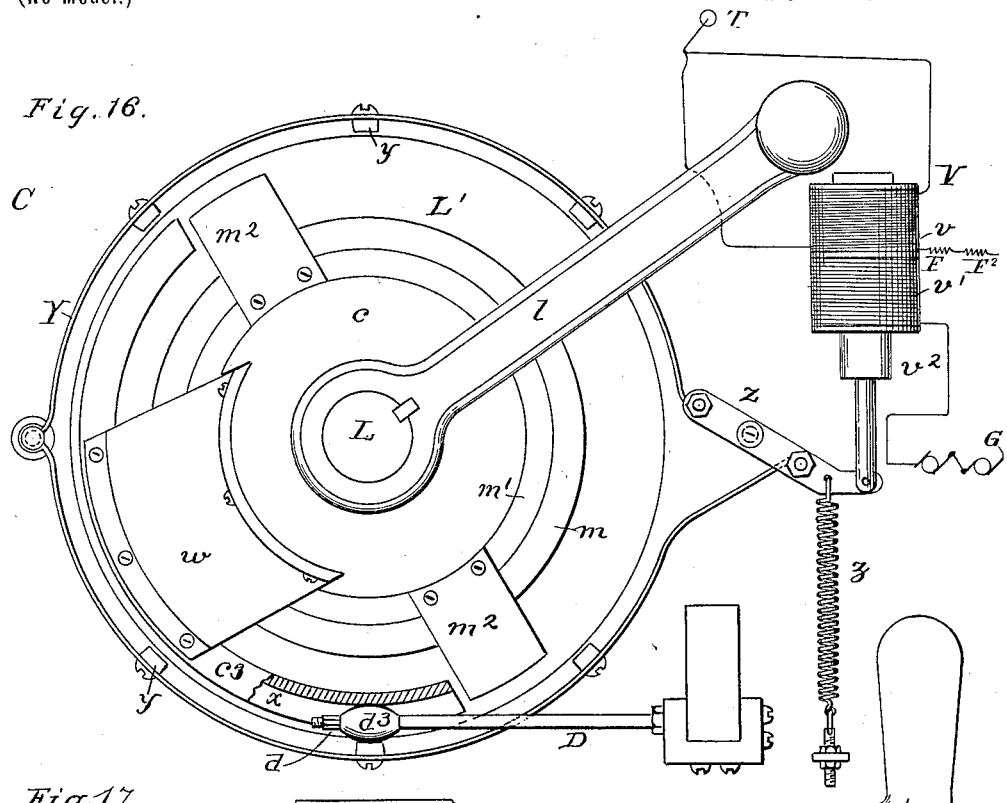
Figure 17:
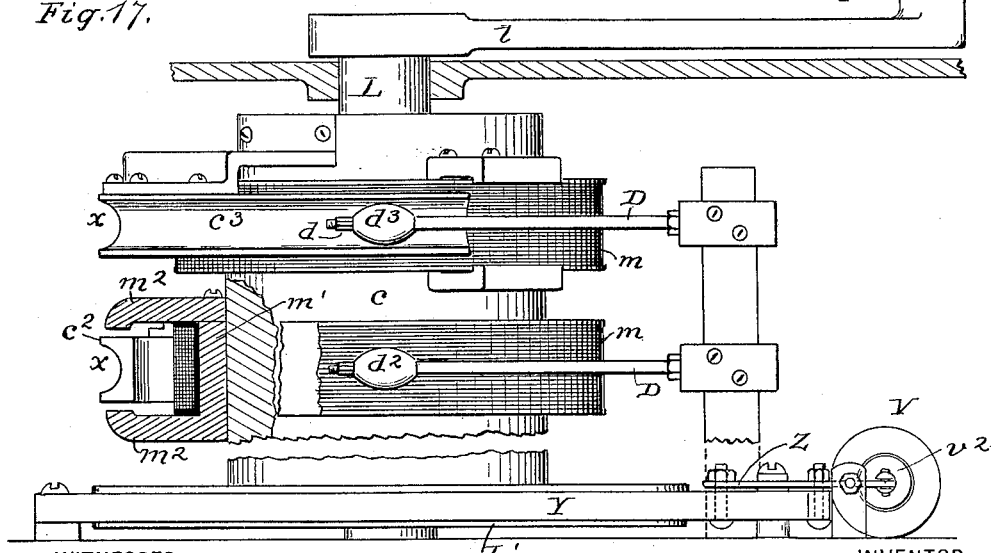

In the accompanying drawings, which form a part of this specification, Figures 1 to 14 are diagrams showing the successive conditions of the circuit connections corresponding to the successive steps by which, according to my invention, the car-operating circuits are changed from a condition of maximum acceleration to a condition of maximum retardation. Fig. 15 is a diagrammatic development of the controller whereby this change is effected, showing also diagrammatically the motors and other devices and the connections thereof to the controller. Figs. 16 and 17 are respectively top and side views of the controller, both being partly sectional, and Fig. 17 showing only the upper and lower ends of the controller, the intermediate part being broken away.

Referring to Figs. 1 to 15, A and F represent, respectively, the armature and the field-magnet of one motor of a car equipment, and A' and F' represent the armature and field-magnet of the other motor of such equipment.

C represents the controller, here shown in development, the cylinder-contacts $c'$ $c^2$ $c^3$, &c., thereof making contact with fixed terminals $d'$ $d^2$ $d^3$, &c.

From the trolley or line connection $t$ a connection is made, through the wire 21, including the usual main switch $k$, to a junction-point 22, whence lead two paths for the current, one through wire 23 and the controller to the armature-circuit and the other through the wire 24 to the field-magnet circuit. Resistances $r'$, $r^2$, $r^3$, and $r^4$ are arranged to be inserted in or withdrawn from this field-magnet circuit by the operation of the controller C, so as to vary the field-magnet strength and thus vary the speed or the counter electromotive force of the armatures. A fuse $f$ may be included in each of these circuits.

I prefer to reverse the motion of the armatures by reversing the magnetization of the field-magnets, and for this purpose I arrange the reversing-switch S in the field-magnet circuit, as shown.

The function of the controller C is, primarily, to change the armatures A A' from series to parallel relation, and vice versa, and also to vary the resistance of the field-magnet circuit.

The dotted lines 1 2 3, &c., in Fig. 15 indicate the successive lines of contact of fixed contacts $d'$ $d^2$, &c., with the cylinder-contacts $c'$ $c^2$ $c^3$, &c., in the successive positions of the controller corresponding to the successive circuit conditions represented, respectively, in Figs. 1 to 14.

Position 1 is the position for maximum speed, the armatures being in multiple and the resistances $r'\ r^2\ r^3\ r^3\ r^4$ being all included in the field-magnet circuit, so that the fields are relatively weak. In this position (see Figs. 1 and 15) the current passes from the line connection $t$, through wires 21 and 23, to contact $d^2$, and from this contact it passes through the armatures in multiple, one path leading, through armature A, contacts $d^3\ c^3$, connection 25, contacts $c^5\ d^5$, and connection 27, to ground at G, and the other path leading from contact $d^2$, through cylinder-contact $c^2$ and connection 28, to contact $c^4$, and thence, through contact $d^4$ and armature A', directly to ground connection 27. The field-magnet circuit may be traced from junction 22, through wire 24, reversing-switch S, wire $24^a$, resistances $r'\ r^2$, field-magnet F, field-magnet F', resistances $r^3\ r^4$, wire $24^c$, the other side of reversing-switch S, and wire $24^b$, to ground connection 27.

Position 2 (see Figs. 2 and 15) is similar in all respects to position 1, except that resistances $r^2\ r^3$ have been short-circuited by contacts $c^7\ c^8$, connected by connection 30, and contacts $c^{10}\ c^{11}$, connected by connection 31, said sets of contacts engaging, respectively, with fixed contacts $d^7\ d^8$ and $d^{10}\ d^{11}$, connected, respectively, to opposite sides of said resistances $r^2\ r^3$. The change from the first to the second position therefore simply diminishes the resistance in the field-magnet circuit, thus increasing the field-magnet strength and the counter electromotive force of the motors. This will result in diminished acceleration or in actual retardation, according to the relative conditions of line electromotive force and counter electromotive force, as is well understood.

The next step (position 3) will further increase the field-magnet strength by the short-circuiting of resistances $r'\ r^4$ by contacts $c^6$ and $c^{12}$, connected to the contacts $c^8\ c^{10}$ by connections 32 33 and contacting in this position with fixed contacts $d^6\ d^{12}$, leading to the outer sides of said resistances. This results in full energization of the field-magnets and in the least acceleration or greatest retardation that can be effected with the motors in parallel connection. The next four steps, 4, 5, 6, and 7, are for the purpose of throwing the motors from parallel to series connection, steps 4, 5, and 6 being simply transition steps leading to the series working position 7. During such transition steps the resistances $r'\ r^2\ r^3\ r^4$ are preferably maintained short-circuited by contacts $c^6\ d^6\ c^8\ d^8\ c^{10}\ d^{10}\ c^{12}\ d^{12}$, which are made long enough for that purpose.

Referring now to Figs. 4 and 15, it will be seen that the first transition step opens the circuit of armature A by means of contact $c^3$ leaving contact $d^3$ and at or about the same time short-circuits the field-magnet F of the same motor by contact $c^9$, connected to contact $c^8$ by connection 35 and engaging with fixed contact $d^9$, leading to the junction-point 34 between the two field-magnets. This results in a more or less complete discharge or deënergization of field-magnet F, this being in preparation for the next step, (position 5,) which is the short-circuiting of armature A by a connection 36 between cylinder-contacts $c^{13}\ c^4$, which engage with contacts $d^3\ d^4$. This short-circuiting may be effected either after or substantially at the same time as the opening of connection $d^3\ c^3\ 25\ c^5\ d^5$; but it is essential that it should take place after the short-circuiting of the field F, so as to give sufficient time for the discharge of magnetism in the latter. Thus the short-circuiting of armature A will cause no undue flow of current therein or excessive mechanical strain on the motor. The next step (position 6) opens the original connection of armature A' through connection 28 and contacts $c^2\ d^2\ c^4\ d^4$, leaving armatures A A' both in circuit in series with one another. Field-magnet F, however, in this position still remains short-circuited, so that armature A will not develop any counter electromotive force and the current will pass freely through it to armature A', the field-magnet F' of which is at this time strongly and in fact abnormally energized by reason of the short-circuiting of field-magnet F, so that under these conditions, which it must be remembered are assumed to be more or less transitory, the armature A' is practically taking the whole electromotive force of the line and doing all the work.

The next step, to position 7, reinserts the resistances $r'\ r^2\ r^3\ r^4$ in the field-magnet circuit by reason of contacts $c^6\ c^{12}$ leaving contacts $d^6\ d^{12}$, and at the same time opens the shunt-circuit $d^8\ c^8\ 35\ c^9\ d^9$ around magnet F, thus leaving the field-magnets in condition of equal and minimum energization and bringing the load equally upon both motors. In order to maintain the equality of load and speed of the motions under abnormal conditions, such as slipping of the wheels geared to one of the motors, I prefer to make a cross connection between the armature-circuit and field-magnet circuit at points midway between the two sides of the line—that is to say, midway between line and ground. This cross connection is established when the armatures are brought into effective series relation—that is, in position 7, by a connection 37—leading from contact $c^4$, which at this time is connected between the two armatures, to contact $c^{19}$, which at the same time is connected between the two field-magnets by its engagement with the middle contact $d^9$. The windings and resistances are so proportioned that these middle points between the armatures and field-magnets, respectively, are at the same equal potential, which is the mean of the potentials of the two sides of the line, or of "line" and "ground." This cross connection acts as an equalizer, so that when one of the motors "slips" and races, thus diminishing the electromotive force and current on the other motor, which would thereby be brought to a standstill, the current through the field-magnet of the racing motor will by reason of this cross connection be increased, thus tending to cut down its speed, while the current through the field-magnet of the other motor is at the same time decreased, thus tending to increase its speed. Thus, for example, if we suppose armature A to start racing, it will of course increase proportionately in counter electromotive force, and if this cross connection were not provided the result would be to cut down correspondingly the electromotive force on armature A', which would therefore slow down; but in the present case the increase of counter electromotive force in armature A will cause a correspondingly greater amount of current to be diverted through its field-magnet F, and thus bring the counter electromotive force of armature A so high as to nearly or quite stop the current through it, thereby causing said armature to slow down. At the same time the circuit through the field-magnet F acts as a by-pass around armature A, so that, though this armature will allow but little current to pass, the armature A' will still receive sufficient current through this by-pass and the cross connection 37, and the amount of current through this armature A' will be further increased by reason of the fact of its slowing down and of its resulting greater diversion of current from field-magnet F'.

The next two steps, 8 and 9, are similar in every respect to 7, except that resistances $r^2$ $r^3$ and $r'$ $r^4$ are successively cut out by contacts $c^{17}$ $c^{31}$ $c^{16}$ $c^{32}$, connected by connections 38, 39, 40, and 41 to contacts $c^3$ $c^{10}$ and operating substantially as above described from contacts $c^6$ $c^7$, &c. These resistances are, as indicated, cut out symmetrically on each side of the field-magnet circuit, so that the cross connection will always retain its mean or balanced position between the two sides of the circuit. By these steps the accelerative power of the motor equipment is successively lessened, position 9 (see Fig. 9) being the position of minimum acceleration or of maximum retardation.

The next operation is to cut off the motor-armatures from the line, as indicated in position 10, wherein contacts $c^{13}$ $c^4$ break contact with contacts $d^3$ $d^4$, thus breaking the armature-circuit. The field-magnet circuit, however, remains closed, but the resistances $r'$ $r^2$ $r^3$ $r^4$ are reinserted, as indicated, by contacts $c^{16}$ $c^8$ $c^{10}$ $c^{32}$ leaving the respective fixed contacts, the cross connection being at the same time broken by contacts $c^{19}$ leaving contact $d^9$. The field-magnets are therefore still energized, though not strongly, so that the next step, 11, which short-circuits armature A' by contact $c^{14}$, connected by connection 42 to contact $c^5$, will result in a braking action due to the short-circuit current. This braking action is then successively increased or maintained in the succeeding step, 12, by short-circuiting the other armature A by contacts $c^{22}$ $c^{23}$, connected by connection 43, and in steps 13 and 14 by cutting out the resistances $r'$ $r^4$ and $r^2$ $r^3$, so as to increase the field-magnetization, these operations being effected by contact $c^{26}$ and contacts $c^{27}$ $c^{18}$, connected thereto by connections 44 45, and by contacts $c^{42}$ and contacts $c^{41}$ $c^{20}$, connected thereto by connections 46 47. In the reverse operation of the car, in starting and accelerating, the above steps are passed through in reverse order, thus producing a gradual acceleration. When the change is made from series to parallel, the short-circuiting of the field-magnet acts to more or less completely deënergize the same, so that the short-circuiting of the armature will not result in an excessive current therethrough.

An important point of my invention relates to means for absorbing the induced discharge from the field-magnets whenever the line connections of the motors are interrupted. This I effect by a supplementary or shunt circuit 50, containing a resistance $m$ and brought into circuit between the terminals of the field-magnet circuit whenever the motor-circuit is interrupted by the controller, so that the induced discharge will find a path through this resistance and will therefore be prevented from exerting an injurious strain on the insulation of either the armature or the field-magnets. This shunt-circuit is controlled by contacts $c'$ $c^{21}$ on the cylinder, which engage with fixed contact $d'$, connected through resistance $m$ to the trolley of the circuit and which are connected by connections $50^a$ $50^b$, respectively, with the "ground-contact" $c^5$. The contact $c'$ closes this short circuit at or just before the instant that the circuit of armature A is opened in position 4, while contact $c^{21}$ again closes it at or just before the instant of the opening of the armature-circuit in position 10 and maintains it closed during the remaining steps 11 to 14, so that if during the braking operation the field-magnet circuit is broken, as by the trolley leaving the line, this shunt will absorb the induced current from the field-magnets. In this connection it will be noted that as long as the armatures are in circuit they furnish a derived current for the field-magnets which will absorb or receive any induced discharges from the latter; but when one or both of the armatures is removed from the circuit this supplementary path or shunt is brought into connection by the operation of the controller, so as to receive any induced discharge from the field-magnet due to interruption of the line connection. The resistance $m$ may consist of the coil or coils of the blow-out magnet or magnets for the controller, as hereinafter specified, and as such coil or coils are desirably brought into action at the moments when the circuit of one or both of the armatures is interrupted the arrangement of the shunt-controlling contacts, as above described, is especially adapted to such a purpose.

The controller C is preferably of the construction shown in Figs. 16 and 17, its body $c$ of insulating material being mounted on a shaft or arbor L, provided with a handle $l$ and having the contacts $c^2 c^3$, &c., fastened thereon. These contacts are preferably metal segments attached to the cylinder $c$ by brackets $w$, which support the segments at a certain distance from the cylinder, so as to leave an intermediate air-space. These contact-segments are preferably provided with rounded grooves $x$ on their outer or contact faces, and the fixed contacts $d^2 d^3$ consist of rounded blocks supported so as to be rotatably movable at right angles to the motion of the controller-cylinder on spring-rods D and engaging in these grooves. By means of suitable clamping devices, as screw-nuts $d$, the knobs $d^2 d^3$, &c., can be set in any desired position and can be turned around when desired, so as to present new surfaces for wear.

Between the contact-segments $c' c^2$, &c., and the cylinder-body C are arranged the coils $m$ and the annular cores $m'$ of the arc-rupturing magnets. The annular cores $m'$ surround the cylinder-body $c$ and are surrounded by their exciting-coils $m$, the effect of which is to develop opposite polarity at the upper and lower ends of each annular core. Projections $m^2$ project out from the top and bottom of each annular core into proximity to the ends of the contact-segments at the points where arcing is liable to occur, the lines of force from the several magnets thus being directed across the arc and rupturing same in a well-known manner. The energizing-coils $m$ of these magnets are preferably connected together in series, and together may, as above described, be included in a shunt across the field-magnet circuit when the motor-circuit is broken, connections being made to these blow-out magnets on the controller-cylinder by means of suitable flexible connections or otherwise.

In the operation of electric cars wherein the motors are used to brake the cars by causing them to act as generators care must be taken to prevent excessive overloads on the motors during such braking operation. In practice it is customary that the cars be stopped quicker than it is practicable to get them under headway; but there is, of course, a limit beyond which it is not safe to go, as otherwise too great a strain, both mechanical and electrical, would be thrown on the motors. To insure that this limit shall not be exceeded, I provide a braking device for the controller, the same consisting, for example, of a friction-clutch connected to and operated by an electromagnetic device responsive to an excess of current when the motor-armatures are feeding back into the line. This electromagnetic device may consist of a solenoid V, having a coil $v$ connected in the field-magnet circuit and a coil $v'$ connected in the armature-circuit. The armature or core $v^2$ of this solenoid is carried by a lever Z, which is retracted by a spring $z$ and is connected to a brake device for the controller-cylinder. This brake device may consist of a band Y, carrying shoes $y$, capable of bearing on the periphery of a disk L', attached to the controller-cylinder so as to turn therewith. When the armature-circuit is absorbing energy from the line, the currents in coils $v v'$ will act differentially, but when the current in the armatures reverses—that is to say, when the armatures are forcing current against the line electromotive force—then the two coils $v v$ act in the same direction on the core $v^2$, and when the reverse armature-current becomes excessive the core is drawn up against the action of its spring and the friction-clutch is tightened, causing the motion of the controller to be retarded.

Fig. 16 shows the preferred method of connecting the solenoid to the different circuits. T represents the trolley; F F$^2$, field-magnets; A A$^2$, the armatures, and G the ground.

Having thus described my invention, the following is what I claim as new therein and desire to secure by Letters Patent:

1. The method of changing the two motors of a car equipment from series to parallel relation which consists in short-circuiting the field-magnet of one of said motors, subsequently short-circuiting the armature of said motor, breaking the series connection and closing a connection placing said armatures in parallel, and breaking the short-circuit through its field-magnet.

2. The method of changing from series to parallel relation the two motors of a car equipment whose armatures and field-magnets are in independent circuits, which consists in short-circuiting the field-magnet of one of said motors and simultaneously delivering correspondingly greater amount of current to the field-magnet of the other motor, and then connecting the motor-armatures in parallel, by changing the connections of the armature under the short-circuited field-magnet.

3. The combination with the armatures and field-magnets of the two motors of a car equipment provided with a field-magnet-energizing circuit independent of the armature-circuit, of controlling mechanism and connections adapted to change the armatures from series to parallel relation by short-circuiting the field-magnet of one of the motors, subsequently short-circuiting the armature of such motor, closing a parallel connection to the other armature after breaking the series connection of such armature and the short-circuit around its field-magnet.

4. The combination with the armatures and field-magnets of the two motors of a car equipment, provided with a field-magnet-energizing circuit, independent of the armature-circuit and including both field-magnets in series, of controlling mechanism and connections for changing the armature from series to parallel relation by short-circuiting the field-magnet of one of the motors, thereby deenergizing such field-magnet and superenergizing the field-magnet of the other motor, then closing a parallel connection and breaking a series connection for the armatures.

5. The combination with the armature and field-magnets, of the two motors of a car equipment provided with a field-magnet-energizing circuit independent of the armature-circuit and including both field-magnets in series, of means for connecting the armatures in series relation, and means for establishing a cross connection from a point between the two armatures in series to a point between the two field-magnets.

6. The combination with the armature and field-magnets of the two motors of a car equipment provided with a field-magnet-energizing circuit independent of the armature-circuit and including both field-magnets in series, of means for connecting the armatures in series relation, and means for establishing a cross connection from a point between the two armatures in series to a point between the two field-magnets, regulating-resistances being included in each side of the field-magnet circuit and provided with means whereby they may be cut out simultaneously and symmetrically on the two sides.

7. The combination with the armatures and field-magnets of the two motors of a car equipment provided with a field-magnet-energizing circuit independent of the armature-circuit and including both field-magnets in series, of means for placing the armatures in either series or parallel relation, and controlling devices and connections adapted to be brought into operation when the armatures are in series relation, to close a cross connection from a point between the two armatures to a point between the two field-magnets.

8. The combination with a motor of a car equipment, having its armature and field-magnet included in independent circuits, of means for opening and closing the armature-circuit, and a shunt-circuit including a resistance and means for bringing said shunt-circuit into connection across the field-magnet circuit when the armature-circuit is opened.

9. The combination with a motor of a car equipment, having its field-magnet and armature in independent circuits, a controller comprising contacts for opening and closing the armature-circuit, a blow-out magnet arranged in operative relation to such controller-contacts, and means for bringing said blow-out magnet into operative connection with the motor-circuits when the said contacts break the armature-circuit.

10. The combination with an electric motor and independent supply connections for the armature and field-magnets thereof, of a controller for controlling such connections and an electromagnetic brake for said controller having operating connections with the armature and field-magnet circuits of the motor and responding to an excessive current in the armature-circuit to brake or stop the controller.

11. The combination with an electric motor and supply connections therefor, a controller for controlling the connections of said motor to bring its counter electromotive force above that of the supply connections and an electromagnetic controlling device responsive to an abnormal current flowing back from said motor through the supply connections, to retard or stop the motion of the controller.

12. An electric controller comprising an insulating-cylinder, a series of contacts mounted thereon, a plurality of annular magnets surrounding, and mounted on, said cylinder, and having extensions projecting into proximity with such contacts.

13. An electric controller comprising an insulating-cylinder, a series of contacts supported thereon in such manner as to leave free intermediate spaces and blow-out magnets located in such spaces and having pole-pieces extending into proximity to such contacts.

14. An electric-circuit-controlling device comprising two relatively-movable contacts, one of such contacts being rotatably adjustable so as to present different contact-surfaces, and means for clamping said contact in adjusted position.

15. In an electric-circuit controller, the combination of a rotary contact, and a device contacting therewith, and consisting of a rounded block rotatably movable at right angles to the direction of motion of the other contact.

16. In an electric-circuit controller, the combination of a rotary contact, having a rounded groove, a rounded contact-block engaging in said groove, and a spring-rod on which said block is rotatably adjustable at right angles to the direction of motion of the other contact.

17. In a controller arranged to connect a pair of motors from series to parallel relation, means for establishing a cross connection centrally between the fields and armatures when the motors are working in series, and breaking said connection when the motors are to be operated in parallel.

18. In combination with dynamo-electric machines an independent circuit in parallel with said machines and switching devices arranged to complete said circuit when the armature-circuit is broken.

JOHN C. HENRY.

Witnesses:
JAMES A. KILTON,
G. S. STUNNER.